United States Patent [19]
Rice et al.

[11] Patent Number: 5,088,369
[45] Date of Patent: Feb. 18, 1992

[54] BLADE TENSIONING DEVICE FOR SCROLL SAW

[75] Inventors: Verle L. Rice, Harrisonville; Richard Keener, Garden City, both of Mo.

[73] Assignee: R. B. Industries, Inc., Harrisonville, Mo.

[21] Appl. No.: 706,176

[22] Filed: May 28, 1991

[51] Int. Cl.[5] .................... B23D 49/00; B27B 19/02
[52] U.S. Cl. ........................ 83/783; 83/581.1; 83/662; 83/699
[58] Field of Search ............ 83/581.1, 783, 784, 83/781, 782, 785, 786, 622, 699

[56] References Cited

U.S. PATENT DOCUMENTS

| | | | |
|---|---|---|---|
| 332,391 | 12/1885 | Goodell | 83/581.1 |
| 4,503,742 | 3/1985 | Sutton | 83/581.1 X |
| 4,681,006 | 7/1987 | Miller | 83/581.1 X |
| 4,724,735 | 2/1988 | Rice | 83/581.1 X |
| 5,016,512 | 5/1991 | Huang | 83/581.1 X |

*Primary Examiner*—Frank T. Yost
*Assistant Examiner*—Rinaldi Rada
*Attorney, Agent, or Firm*—Shook, Hardy & Bacon

[57] ABSTRACT

An auxiliary blade tensioning device for a scroll saw 10 permits quick selective adjustment of the tension of the blade 20. A scroll saw 10 utilizing the blade tensioning device of the invention preferably includes a pair of arms 14 and 16 mounted on a frame 12 for cooperative support of a saw blade 20 and reciprocation by a power assembly 18. The uppermost, articulated arm 14 is coupled with a camming mechanism 22 for quick, selective tensioning of a replacement saw blade 20.

7 Claims, 2 Drawing Sheets

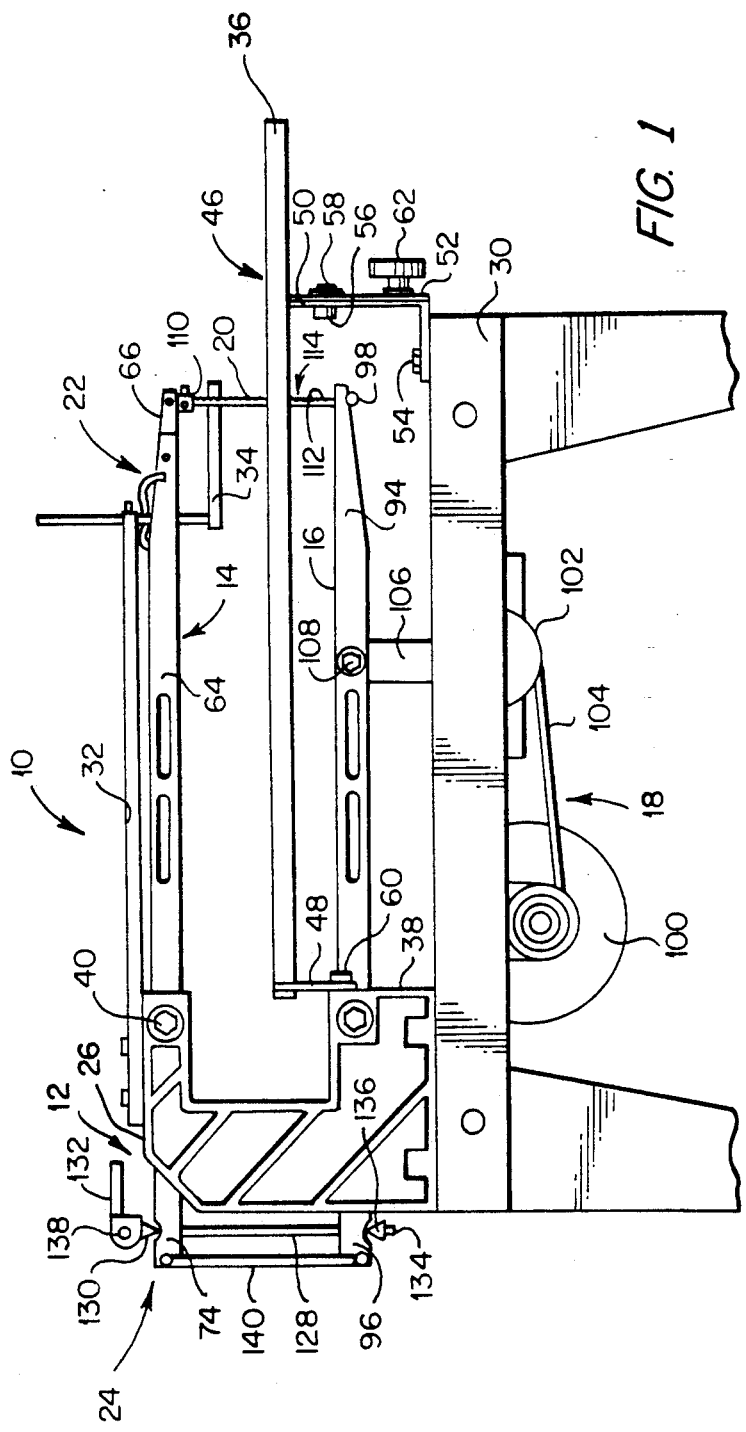
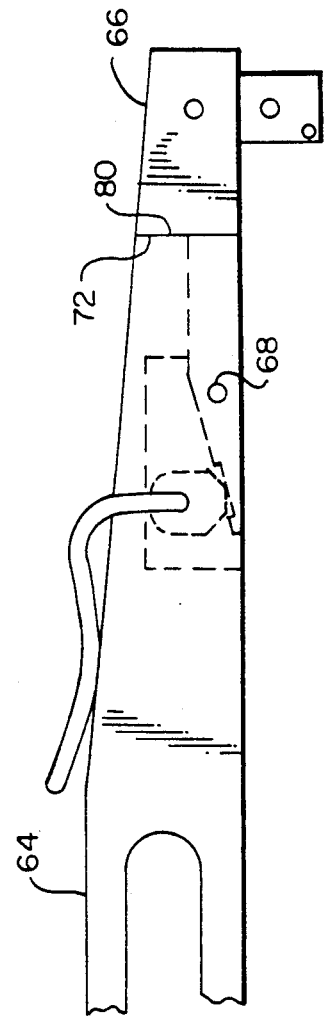
FIG. 1
FIG. 2

BLADE TENSIONING DEVICE FOR SCROLL SAW

BACKGROUND AND SUMMARY OF THE INVENTION

1. Field of the Invention

The present invention is broadly concerned with a blade tensioning device for a scroll saw which permits quick selective adjustment of the tension of the blade. More particularly, it is concerned with a scroll saw including a pair of arms mounted on a frame for cooperative support of a saw blade and reciprocation by a power assembly. The uppermost, articulated arm is coupled with a camming mechanism for quick, selective tensioning of a replacement saw blade.

2. Description of the Prior Art

Scroll saws are widely used for fine woodwork by craftsmen and amateurs. The saws employ parallel arms which hold the blade and reciprocate in unison to accomplish a precise cutting action. It is necessary to provide some type of blade tensioning device to achieve proper tensioning of a particular blade designed for cutting a particular material.

Previous blade tensioning mechanisms for scroll type saws, such as that described in U.S. Pat. No. 4,724,735, permitted quick release and retensioning of the saw blade to a single, preset tension. Thus, for example, a blade designed for use on a metal workpiece could quickly be replaced by another identical blade. However, replacement of the blade with one of a slightly different thickness designed for use on a wood or plastic workpiece required cumbersome and time consuming resetting of the tension to accommodate each new blade.

SUMMARY OF THE INVENTION

The present invention overcomes the problems outlined above and provides a greatly improved scroll saw including a mechanism which can quickly and selectively adjust the tension of the blade.

Broadly speaking, the scroll saw includes a frame having a pair of vertically spaced pivot axes, an apertured working surface, and upper and lower arms cooperatively supporting saw blade which extends through the aperture. The arms are mounted for reciprocation about the respective axes by a power assembly. The upper arm is articulated, having an inboard section pivotally coupled with a outboard section. A camming mechanism is pivotally coupled with the first arm at a point inboard of the pivot axis of the outboard section. The camming mechanism includes a camming surface which is engageable with the outboard section to move the latter about its pivot axis and thus shift the blade between a tensioned and a relaxed position.

In preferred forms, the camming mechanism includes a plurality of camming surfaces, any one of which is engageable with the outboard section to move the latter about its pivot axis and thereby vary the tension on the saw blade. In addition, the outboard section includes an inwardly projecting tongue for engagement with the camming surfaces. The preferred camming mechanism also includes a handle for selective manual rotation.

Other and further objects of the invention, together with the features of novelty appurtenant thereto, will appear in the course of the following description.

DESCRIPTION OF THE DRAWINGS

In the accompanying drawings which form a part of the specification and are to be read in conjunction therewith and in which like reference numerals are used to indicate like parts in the various views:

FIG. 1 is a side elevational view of a scroll saw having a blade tensioning device in accordance with the present invention;

FIG. 2 is an enlarged fragmentary side elevational view with certain parts in phantom, showing the upper arm of FIG. 1 with the blade tensioning device in fully tensioned position;

DETAILED DESCRIPTION OF THE INVENTION

Figure 3:
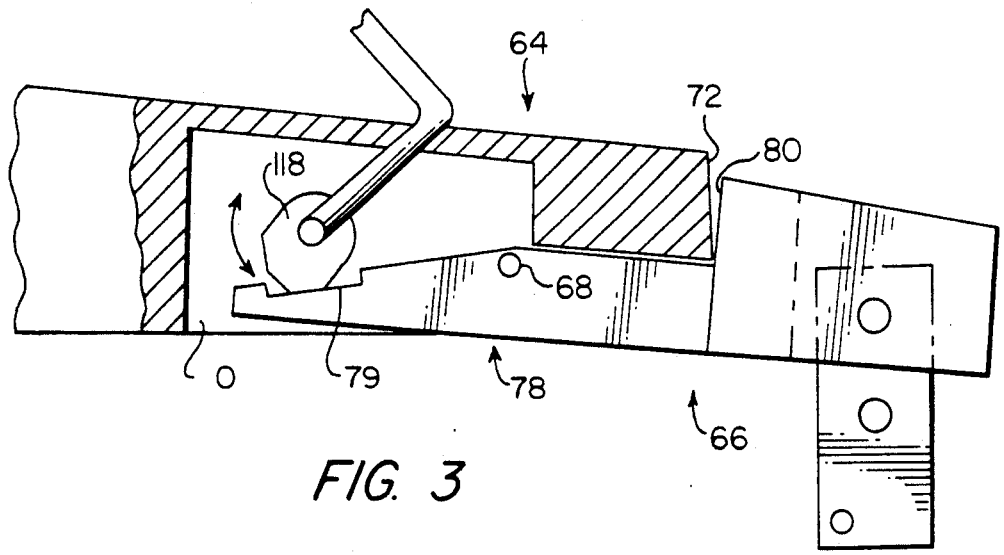
FIG. 3 is an enlarged sectional view of the apparatus of FIG. 2 with parts broken away, showing the blade tensioning device in partially relaxed position.

Referring now to the drawing, a scroll saw having an auxiliary blade tensioning device 10 in accordance with the present invention is illustrated in FIG. 1 and includes frame 12, upper and lower arms 14 and 16, power assembly 18, saw blade 20, camming mechanism 22, and rear blade tensioning mechanism 24. Those skilled in the art will appreciate that the blade tensioning device of the invention may be embodied in connection with any of a number of other forms of scroll saws.

In more detail, frame 12 includes a pair of C-shaped mounting members 2 (one of which is visible in FIG. 1) supported in an upright position by framework 30. One of the mounting members 26 supports a forwardly extending arm 32 which is remotely and adjustably coupled with foot 34 for holding a work piece in place during operation of the saw. Mounting members 26 and framework 30 cooperatively support apertured table 36 in generally transverse, forwardly extending horizontal position. Arms 14 and 16 are pivotally coupled between mounting members 26 by means of transversely extending bolts 38 and 40. Those skilled in the art will appreciate that in other embodiments a single mounting member of unitary construction may be employed.

Table 36 further includes working surface 46 for supporting a workpiece, downwardly extending rear mounting bracket 48, and front mounting flange 50. The forwardmost portion of framework 30 includes upwardly extending front bracket 52 coupled to the framework by means of bolt 54. Front bracket 52 is coupled with flange 50 by means of nut and bolt 56 and 58. Rear bracket 48 is coupled with the forwardly extending lower leg portion of mounting member 26 by screw 60. Front bracket 52 is equipped with a knob 62 to permit pivotal adjustment of table 36 to vary the angle of working surface 46.

Figure 4:
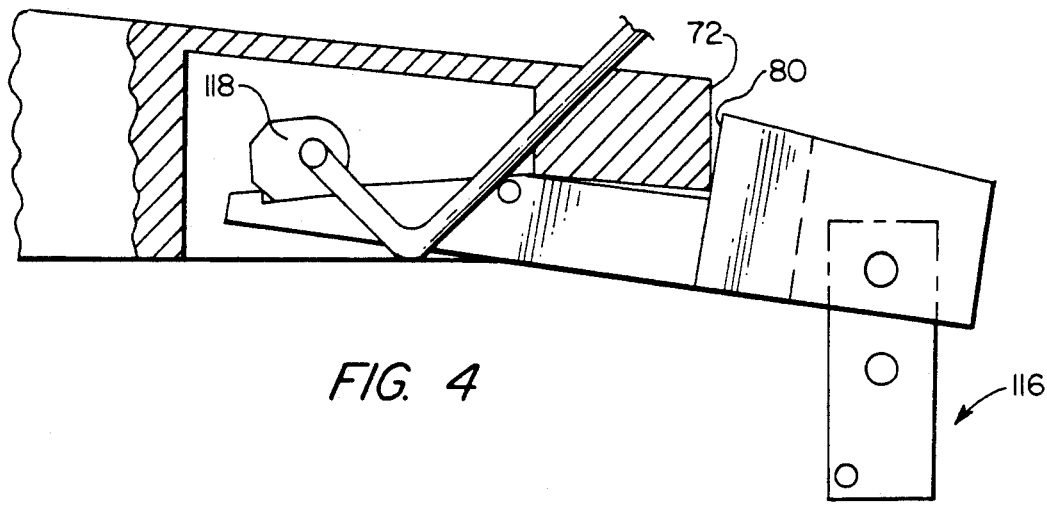
FIG. 4 is an enlarged sectional view similar to FIG. 3, showing the blade tensioning device in fully relaxed position.
Figure 5:
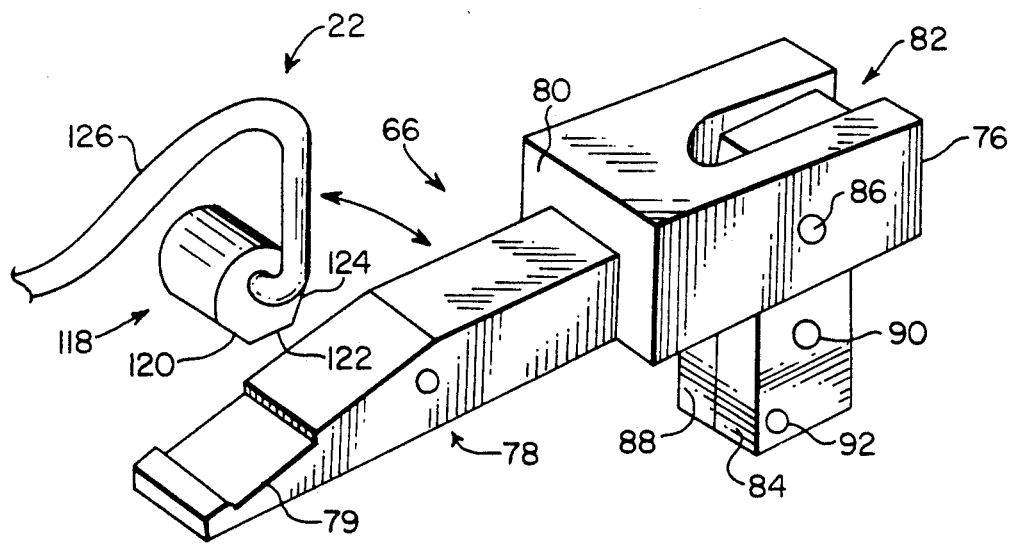
FIG. 5 is a partially exploded perspective view of the cam and outboard section of the upper arm of FIG. 1.

As best shown in FIGS. 2, 3, and 4, articulated upper first arm 14 includes inboard and outboard sections 64 and 66 pivotally coupled by pin 68. The outermost portion of inboard upper arm section 64 includes a groove 70, and an outboard arm-contacting surface 72 (FIG. 3). As shown in FIG. 1, second end 74 extends beyond frame 12 for engagement by rear blade tensioning mechanism 24. As best shown in FIG. 5, upper arm outboard section 66 includes outermost first end 76, and inwardly projecting tongue portion 78, including depressed flat follower face 79. First end 76 includes an inboard arm-contacting surface 80 and a slot 82 to accommodate a first blade holder element 84 mounted on pivot pin 86 extending transversely therethrough for rotation about a pivot axis.

Generally rectangular blade holder 84 extends downwardly from pivot pin 86 and is coupled with a second complemental blade holder element 88 by a compression pin 90. An Allen or other such adjustable screw 92 is provided to join the blade holder elements 84 and 88 into tight engagement.

As shown in FIG. 1, second arm 16 extends in generally parallel relationship below first arm 14 and includes an outboard first end 94 and an inboard second end 96. Second end 96 extends beyond frame 12 for engagement by rear blade tensioning mechanism 24. First end 94 includes a lower blade holder 98.

Power assembly 18 is mounted generally below framework 30 and includes a motor 100, a forwardly mounted pulley assembly 102, and an interconnecting endless drive belt 104. A drive arm 106 extends upwardly from pulley assembly 102 and is pivotally coupled with lower arm 16 by pin 108. In the preferred embodiment, motor 100 is a conventional electric shop motor. However, in other embodiments any suitable power source may be employed.

Saw blade 20 includes upper and lower ends 110 and 112 and is cooperatively supported in generally vertical disposition between upper and lower arms 14 and 16 at selected positions between a fully tensioned position 114, and a relaxed position 116, best shown in FIG. 4. In particular, upper end 110 is sandwiched between blade holders 84 and 88 and frictionally held by a compression force exerted by Allen screw 92. Lower end 110 is secured by lower blade holder 98.

As shown in FIGS. 3-5, cam mechanism 22 includes a cam 118, having a plurality of camming surfaces 120, 122 and 124 and a lever arm handle 126 of unitary construction. The preferred cam includes three camming surfaces to provide a range of tension adjustments. However, in other embodiments, two or more than three camming surfaces may be provided. Camming surfaces 120, 122 and 124 are preferably flat but concave or other suitable surface configurations may be employed.

As best shown in FIG. 1, rear blade tensioning mechanism 24 includes a generally upright bolt 128 extending vertically through the end portions 74 and 96 of upper and lower arms 14 and 16 and an eccentric cam 130 having a handle 132. Bolt 128 is adjustably fastened at its lowermost end by lock nut 134. Wedge 136 is positioned between nut 134 and arm end portion 96. At its uppermost end, bolt 128 is fastened above upper arm end portion 74 by transverse pin 138. Cam 130 is mounted for rotation about pin 138 between a fully tensioned and a relaxed position. Coil type damping spring 140 extends between the outermost end portions 74 and 96.

In the preferred embodiment, scroll saw 10 and more particularly, frame 12, arms 14 and 16, saw blade 20, and cam mechanism 22 are constructed of corrosion-resistant metals. However, supporting framework 30 may also be constructed of wood, fiberglass, or synthetic resin materials.

In operation, motor 100 drives belt 104, causing pulley assembly 102 to rotate and reciprocate drive arm 106 in a generally up-and-down motion. Drive arm 106 in turn reciprocates lower arm 16 in similar motion about pivot pin 38. Bolt 128 transfers the motion of lower arm 16 to upper arm 14, causing it to reciprocate in parallel motion about pin 42 when saw blade 20 is in place. Blade 20, which is cooperatively supported between arm 14 and 16 to extend through apertured table 36, reciprocates in like up-and-down manner. A workpiece is supported on table working surface 46 for movement into cutting contact with blade 20. Foot 34 is adjusted downwardly to rest on the workpiece to hold it in place during the sawing operation.

Initial insertion of a saw blade 20 is accomplished by rotating eccentric cam 130 about pin 138 by means of handle 132 until opposed arm second ends 74 and 96 are permitted to move farther apart. As second ends 74 and 96 move apart, arms 14 and 16 pivot about bolts 38 and 40 so that first arm ends 76 and 94 are brought closer together to permit insertion of blade 20 into lower blade holder 98 and between upper blade holders 84 and 88. The blade is tightened into place by rotation of Allen screw 90. Eccentric cam 130 is again rotated about pin 138 by means of handle 132 until opposed second arm ends 74 and 96 are forced toward each other to their maximum blade tensioning position. The tension may be adjusted by reversing the actions previously described until the slack blade position is achieved. Lock nut 134 is then tightened to force arm ends 74 and 96 together, or loosened to allow them to move apart until appropriate tensioning of the blade is achieved. In other embodiments lacking the rear camming device described above, any number of other mechanisms may be employed to initially insert and tension a blade 20.

Thereafter, an operator may wish to quickly change, for example, from a wood blade to one suitable for cutting metal. In such instances, cam 118 is actuated by rotating handle 126 in clockwise direction parallel to the longitudinal axis of saw 10 to the position shown in FIG. 4 in which follower face 79 contacts camming surface 124. This causes outboard section 66 to rotate clockwise about pin 68 moving upper arm end 76 and attached blade holders 84 and 88 downwardly toward lower arm end 94 and releasing the tension on blade 20. The blade is then removed and replaced with a new blade and handle 126 is rotated counter-clockwise to rotate cam 118 until camming surface 122 is brought into contact with follower face 79. If additional tensioning is required, rotation of handle 126 is continued until the appropriate cam surface is brought into contact with follower face 79 to achieve the correct tensioning of blade 20. The maximum possible tensioning is achieved when articulated upper arm 14 presents an unbroken profile as shown in FIG. 2. This occurs when outboard and inboard arm contacting surfaces 72 and 80 are brought into contact to cooperatively serve as a stop, preventing further upward rotation of outboard arm section 66 about pin 68.

In this manner, a scroll saw with blade tensioning device of the present invention provides for quick removal and replacement of a correctly tensioned saw blade with a blade having different specifications The new blade may be quickly and readily adjusted to any one of several selected preset tensions by rotation of handle 126 without the need for tightening or loosening of a nut 134, knob, or similar device.

From the foregoing, it will be seen that this invention is one well adapted to attain all the ends and objects hereinabove set forth together with other advantages which are obvious and which are inherent to the structure.

I will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A scroll saw comprising:
   a frame, including a pair of vertically spaced pivot axes, said frame having a work surface including an aperture;
   an upper first arm pivotally mounted on said frame, said first arm having an apertured inboard section pivotally coupled with an outboard section;
   a lower second arm pivotally mounted on said frame in spaced, generally parallel relationship to said first arm, said second arm having first and second end portions;
   power means for reciprocating said arms about said pivot axes;
   a saw blade extending through said aperture in the work surface, said blade presenting a pair of opposed ends, one end being coupled with said first end portion of said lower arm, the other blade end being coupled with said outboard section of said first arm; and
   camming means pivotally coupled with said first arm at a point inboard of the pivot axis of said outboard section, and presenting a plurality of camming surfaces which are engageable with said outboard section to move the latter about its pivot axis, whereby said blade is selectively shifted between a plurality of tensioned positions and a relaxed position.

2. The scroll saw of claim 1, wherein said outboard section includes an inwardly projecting tongue for engagement by said camming means.

3. The scroll saw of claim 1, wherein said camming means includes means for selective manual rotation.

4. The scroll saw of claim 1, wherein said camming surfaces comprise generally flat faces adjacently positioned along said camming means.

5. A scroll saw comprising:
   a frame, including a pair of vertically spaced pivot axes, said frame having a work surface including an aperture;
   an upper first arm pivotally mounted on said frame, said first arm having an apertured inboard section pivotally coupled with an outboard section;
   a lower second arm pivotally mounted on said frame in spaced, generally parallel relationship to said first arm, said second arm having first and second end portions;
   power means for reciprocating said arms about said pivot axes;
   a saw blade extending through said aperture in the work surface, said blade presenting a pair of opposed ends, one end being coupled with said first end portion of said lower arm, the other blade end being coupled with said outboard section of said first arm; and
   a rotatable cam coupled with said first arm at a position inboard of the pivot axis of said outboard section,
   wherein said cam includes a plurality of camming surfaces which, upon rotation of the cam, are successively engageable with said outboard section to move the outboard section about its pivot axis,
   whereby a tension force applied to said blade by said outboard section is varied by rotation of the cam to bring the successive camming surfaces into engagement with the outboard section.

6. The scroll saw of claim 5, wherein said cam is further rotatable to relax the tension force applied to the blade to permit removal thereof.

7. The scroll saw of claim 6, wherein said camming surfaces comprise generally flat faces radially disposed on said cam.

* * * * *